J. W. JOHNSON.
Cotton-Worm Destroyers.
No. 145,572.　　　　　　　　　　Patented Dec. 16, 1873.
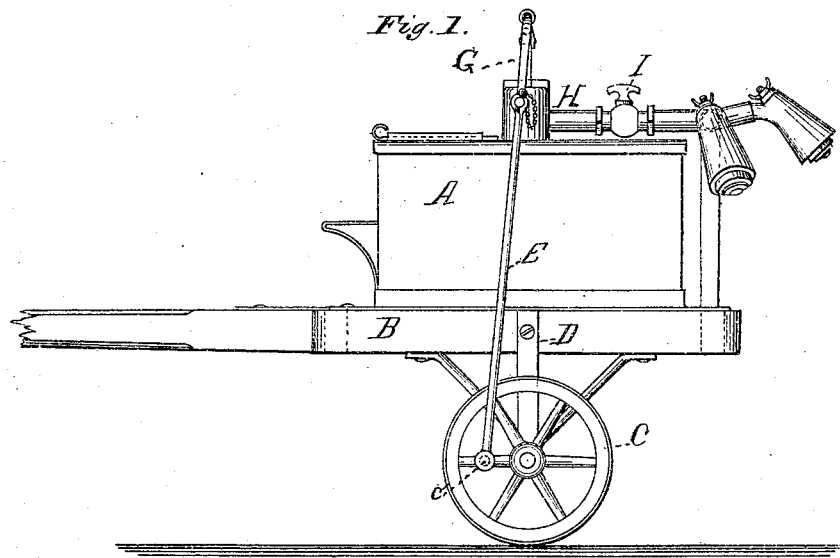
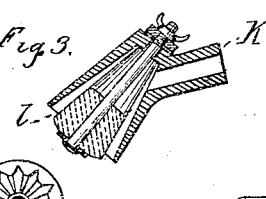
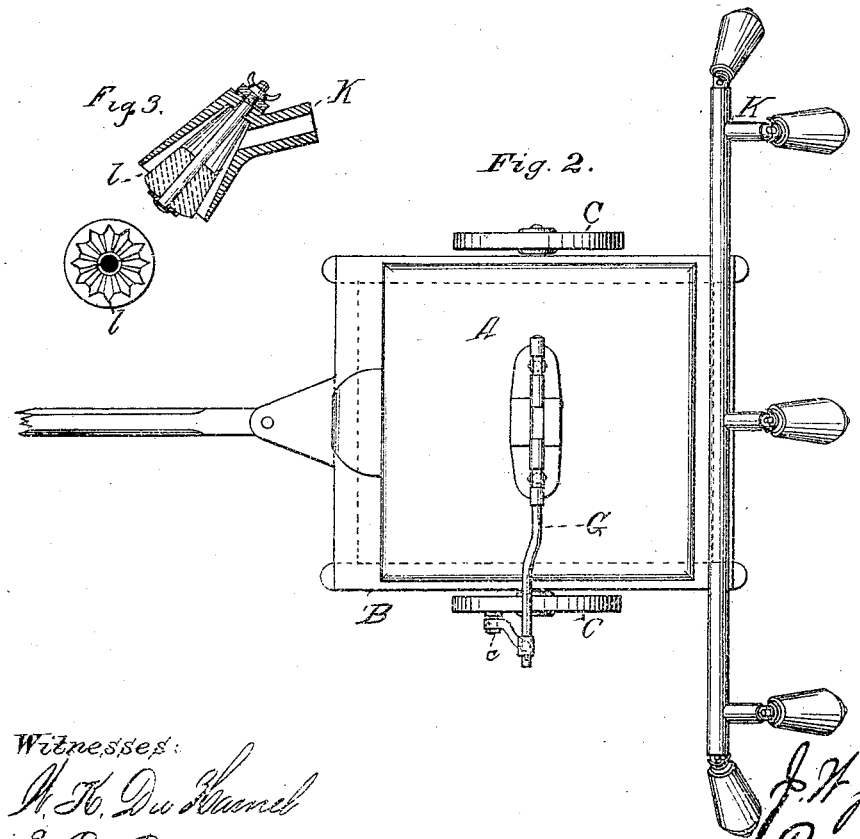

UNITED STATES PATENT OFFICE.

JEHU W. JOHNSON, OF COLUMBUS, TEXAS.

IMPROVEMENT IN COTTON-WORM DESTROYERS.

Specification forming part of Letters Patent No. 145,572, dated December 16, 1873; application filed October 13, 1873.

*To all whom it may concern:*

Be it known that I, JEHU W. JOHNSON, of Columbus, county of Colorado and State of Texas, have invented certain new and useful Improvements in a Machine to Distribute Poisonous Spray upon the Cotton-Worm, of which the following is a specification:

This invention relates to certain improvements on that for which I filed an application for Letters Patent on the 22d day of September, 1873; and the invention consists in a tank provided with a double-acting force-pump, communicating with a pipe and branches similar to those described in my application aforesaid, the pump being connected by a pitman with one of the wheels upon which the tank is supported, whereby the pump is operated automatically as the apparatus is drawn along, the wheels upon which the apparatus is supported being much smaller in diameter than ordinary cart or wagon wheels, and attached to the tank by means of vertical bars, whereby the apparatus is enabled to pass over the rows of cotton-plants without injuring them, while at the same time the dimensions of the wheels are such as to give the required number of strokes to the pump-lever necessary to the producing of a constant and full volume of spray from the pipes.

In the accompanying drawing, Figure 1 is a side view of my invention. Fig. 2 is a top view of the same. Fig. 3 is a sectional view of one of the branch pipes.

A represents the tank containing the liquid compound described in my application aforesaid. Instead of placing it upon an ordinary cart or wagon and working the pump by hand, I attach the tank to a platform or cart-bed, B, provided with two wheels, C. These wheels are much smaller than ordinary cart-wheels, being about twenty or twenty-four inches in diameter, in order to give the required number of revolutions necessary to the successful operation of the pump. In order to place the cart-bed at such an elevation as to enable it to pass over the rows of cotton-plants without injuring them, I attach to each side the upper end of a bar, D, the lower end of which is bent outward and formed into a spindle or axle for the wheel. These bars are of such length that when the wheels are in place the height of the cart-bed from the ground is equal to that of a vehicle provided with wheels from five to six feet in diameter. The wheels C may be of cast-iron, and the bars D may be of wood or iron, as may be preferred. One of the wheels C has a crank-pin, c, formed on or attached to it, at a suitable distance from the center, and to this crank-pin is attached the lower end of a pitman, E, the upper end of which is attached to the pump-lever G. By this arrangement the pump is operated automatically as the apparatus is drawn over the field, thus dispensing with the labor of one man for operating the pump. The pipe and branches are arranged and connected with the pump in a similar manner to that shown in my application aforesaid, the supply-pipe H being provided with a stop-valve, I, to regulate the flow of the liquid. The branch pipes K are made of cast metal, instead of sheet metal, as shown in my application aforesaid, and instead of corrugating the metal as therein shown, I form the grooves $l$ on the inner surface either during the process of casting or by planing or cutting them out afterward, as may be preferred. The branch pipes thus formed are cheaper and more durable than those formed of corrugated sheet metal.

I claim as new and desire to secure by Letters Patent—

1. An apparatus for exterminating cotton-worms, consisting of a tank provided with a double-acting force-pump communicating with a pipe and branches, having the pump connected by a pitman with one of the wheels upon which the tank is supported, combined as shown and described, for the purpose specified.

2. The combination of the cart-bed B, elevating-bars D, wheels C, pitman E, and pump lever G, as shown and described, for the purpose specified.

In testimony that I claim the foregoing as my invention I hereunto affix my signature this 30th day of September, 1873.

JEHU W. JOHNSON.

Witnesses:
K. VOGEL,
WM. KURTHWORTH.